July 24, 1962 E. L. KIMERER 3,045,352
APPARATUS FOR MEASURING THE PERPENDICULARITY
OF A MORTISE OR GAIN TO A BOLT HOLE
Filed Oct. 20, 1958

INVENTOR.
EDWARD L. KIMERER

United States Patent Office 3,045,352
Patented July 24, 1962

3,045,352
APPARATUS FOR MEASURING THE PERPENDICULARITY OF A MORTISE OR GAIN TO A BOLT HOLE
Edward L. Kimerer, 326 E. 17th St., Marysville, Calif.
Filed Oct. 20, 1958, Ser. No. 768,244
2 Claims. (Cl. 33—112)

Generally speaking, the present invention relates to the field of perpendicularity measuring tools, apparatus, and/or devices and, more particularly, pertains to improved apparatus for measuring the perpendicularity of the flat surface of a mortise notch, joint, or gain carried by an object with respect to a hole extending into the object. In one specific form of the present invention, the apparatus is adapted for use in measuring the perpendicularity of a mortise notch, joint, or gain extending in a chordwise direction across a portion of the circular periphery of a round longitudinal wooden pole, such as a telephone pole, or the like, with respect to a bolt hole extending radially into the pole (in most cases, extending diametrically through the pole), thus providing apparatus particularly useful in cutting the plurality of mortise notches and/or gains required by a telephone pole for the purpose of allowing a plurality of wooden cross members to be bolted thereto by means of longitudinal bolts fastened through a corresponding plurality of through bolt holes extending through the center of the telephone pole at vertically spaced locations; the arrangement being such that all of the wooden cross members will lie in substantially the same vertical plane because of the accurate determination of the perpendicularity of each of the flat surface portions of each of the mortises, notches, and/or gains, with respect to each of the plurality of bolt holes, thereby providing a highly desirable and advantageous type of telephone pole and multiple cross member structure.

It is an object of the present invention to provide improved apparatus for measuring the perpendicularity of a flat surface adjacent to a hole in an object and including a longitudinal member having a straight flat longitudinal bottom surface provided with a perpendicularly downwardly directed hole-insert member adapted to be inserted into a hole in an object with said straight flat bottom longitudinal surface resting against a surface portion of the object adjacent said hole for the purpose of determining the perpendicularity and flatness thereof with respect to said hole.

It is a further object of the present invention to provide improved perpendicularity measuring apparatus of the character set forth in the preceding object, wherein the perpendicularly downwardly directed hole-insert member is of longitudinal cylindrical shape and of a size only slightly smaller than the hole into which it is adapted to be inserted.

It is a further object of the present invention to provide improved perpendicularity measuring apparatus of the character set forth in any of the preceding objects wherein the longitudinal member is of substantially rectangular parallelepiped shape.

It is a further object of the present invention to provide improved perpendicularity measuring apparatus of the character set forth in any of the preceding objects, wherein the perpendicularly downwardly directed hole-insert member has an oppositely upwardly directed extension carried at the top of the longitudinal member and adapted for use in sighting along a pole for the purpose of aligning a plurality of holes to be drilled along the pole in longitudinally spaced locations and in similar parallel radial directions with respect to the pole.

It is a further object of the present invention to provide improved perpendicularity measuring apparatus wherein the longitudinal member and the hole-insert member are of hollow construction effectively lightening the apparatus to an extent such as to greatly facilitate the general usage thereof.

It is a further object of the present invention to provide an improved perpendicularity measuring apparatus of the character set forth in any of the preceding objects, wherein the longitudinal member and the hole-insert member are of integral solid construction of relatively lightweight material.

It is a further object of the present invention to provide controllably expandable means carried by the hole-insert member and having a manually adjustable portion for effectively expanding or contracting said expandable means in a direction transverse to the downward direction of the hole-insert member for effective engagement with a hole which is somewhat larger than the hole-insert member.

It is a further object of the present invention to provide improved perpendicularity measuring apparatus of the character set forth in the preceding object, wherein said controllably expandable means includes a threaded shaft portion projecting downwardly from the end of said hole-insert member and carrying expandable washer means thereon and manually controllably advanceable and retractable threaded nut means forcibly abuttable against said expandable washer means to a degree such as to cause a desired effective outside diameter of said expandable washer means suitable for engagement with the hole into which the hole-insert member is inserted.

Other and allied objects will be apparent to those skilled in the art after a careful study of the accompanying illustrations, the present specification, and the appended claims.

To facilitate understanding, reference will be made to the hereinbelow-described drawings, in which:

FIG. 1 is a reduced-size perspective view of one illustrative embodiment of the present invention;

FIG. 2 is an even smaller scale perspective view of the embodiment of the invention illustrated in FIG. 1 shown in perpendicularity measuring relationship with respect to a mortise, notch, or gain cut in a chordwise direction across a portion of a circular periphery of a round longitudinal wooden pole, which is shown in fragmentary form, with the hole-insert member of the apparatus of the present invention in actual inserted position within a through bolt hole in a fragmentary portion of the round longitudinal wooden pole;

FIG. 3 is a view showing the perpendicularity measuring apparatus of FIG. 2 in elevation and showing the longitudinal wooden pole in cross section at the plane of the through bolt hole, whereby the operation of the device in measuring the perpendicularity and flatness of the region surrounding the through bolt hole at the top thereof is readily apparent;

FIG. 4 is a fragmentary central cross-sectional view through a slightly modified form of the perpendicularity measuring apparatus of the present invention wherein the hole-insert member carries controllably expandable means at the end thereof operable to be effectively expanded or contracted in a direction transverse to the longitudinal direction of the hole-insert member for effective engagement with a through bolt hole, such as a through bolt hole shown in FIG. 3 extending through the longitudinal wooden pole, where said through bolt hole is substantially larger than the diameter of the hole insert member;

Figures 8, 9:
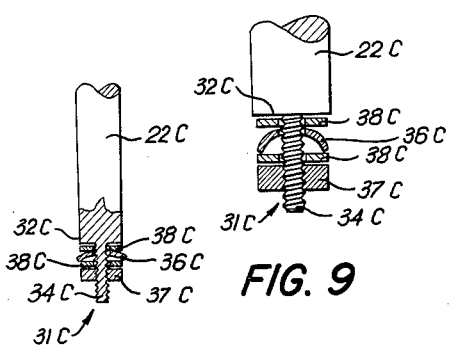
Figure 10:
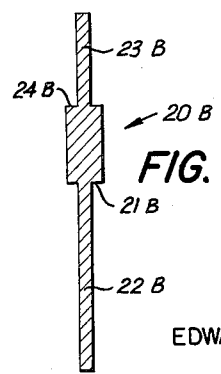

FIG. 8 is a fragmentary partially vertical sectional view of a slightly modified form of the controllably expandable means carried by a slightly modified form of the hole-insert member wherein said hole-insert member is of solid rather than hollow tubular construction and wherein the threaded shaft portion of the controllably expandable means is integrally carried by the hole-insert member and wherein the controllably expandable means is shown after it has been effectively operated into a position such that the expandable washer means has been effectively expanded into a dimension slightly larger than the diameter of the hole-insert member;

FIG. 9 is a larger scale vertical sectional view of the apparatus shown in FIG. 8 but showing the controllably expandable means in non-expanded position; and FIG. 10 is a reduced-size central cross-sectional view of a modified form of the invention, wherein the entire device is of solid construction preferably of relatively lightweight material.

The improved perpendicularity measuring apparatus of the present invention includes a longitudinal member having a straight flat longitudinal bottom surface provided with a perpendicularly downwardly directed hole-insert member adapted to be inserted into a hole in an object with said straight flat bottom longitudinal surface resting against a surface portion of the object for the purpose of determining the perpendicularity and/or flatness thereof with respect to said hole. In the specific example illustrated in FIGS. 1–3, said longitudinal member is of substantially hollow rectangular parallelepiped shape, thus comprising the hollow longitudinal member, indicated generally at 20, having the straight flat longitudinal bottom surface previously referred to at the bottom thereof, as indicated at 21, and having the previously-referred-to perpendicularly downwardly directed hole-insert member carried by said bottom surface 21, as indicated at 22; said downwardly directed hole-insert member 22 being hollow and also having an aligned upwardly directed portion 23 carried by the upper wall 24 of the longitudinal member 20, for purposes which will be described more fully hereinafter.

Figure 1:
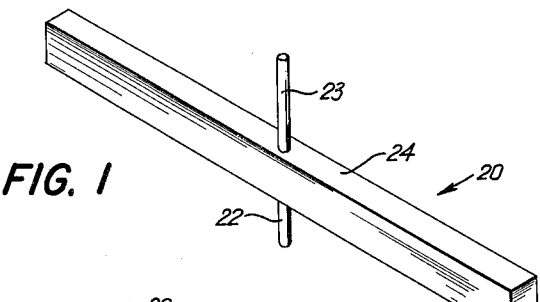
Figure 2:
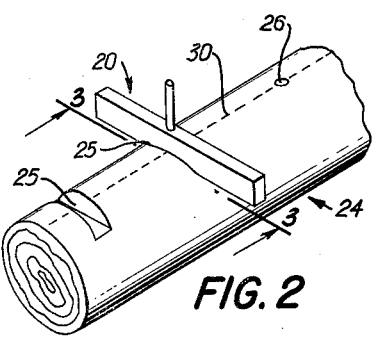
Figure 3:
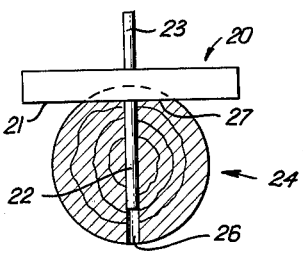
Figure 4:
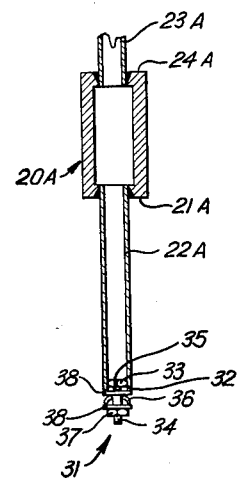
Figure 5:
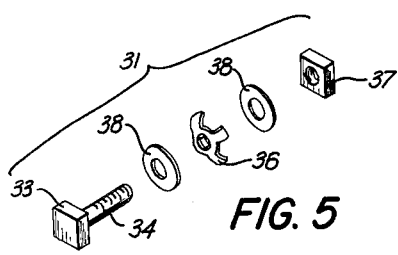
FIG. 5 is a larger scale exploded view of the controllable expandable means shown in FIG. 4 for the purpose of clearly illustrating the structure thereof.

In the specific example illustrated in FIGS. 2 and 3, the perpendicularity measuring apparatus of FIG. 1 is shown in actual perpendicularity measuring use with respect to a portion of a longitudinal wooden pole indicated generally at 24, such as a telephone pole or the like, and wherein two mortises, notches, or gains indicated generally at 25 have been cut by a worker so that each extends in a chordwise direction across a portion of the circular periphery of the round longitudinal wooden pole 24; each of said mortises, notches, or gains 25 being intended to have a flat bottom surface 27 adjacent and perpendicular to its through bolt hole 26 (of a plurality of similar parallel bolt holes 26 spaced along the pole 24) extending diametrically through the longitudinal wooden pole 24. It will readily be understood that said flat surface 27 on the left and right sides of the through bolt hole 26 and at the bottom of a given mortise notch or gain 25 will exactly meet and fully contact the straight flat longitudinal bottom surface 21 of the longitudinal member 20 if the mortise, notch, or gain bottom surface 27 is completely perpendicular to the through bolt hole 26, since the hole-insert member 22 carried within the through bolt hole 26 is completely perpendicular to the longitudinal bottom surface 21 of the longitudinal member 20. Therefore, all that the worker has to do is to look at the hole and the perpendicularity measuring apparatus of the present invention in the position shown in FIGS. 2 and 3 to see whether the bottom surface 21 at either end of the longitudinal member 20 fails to contact the underlying flat notch surface 27. If such is the case, it is then necessary to level off the flat bottom surface 27 of the mortise or notch 25 on the other side of the through bolt hole 26 to an extent such that the flat bottom wall 21 of the longitudinal member 20 fully contacts all of the mortise notch flat bottom surface 27 on each side of the through bolt hole 26. When this has been accomplished, the worker knows that the mortise notch 25 is completely perpendicular to the through bolt hole 26. He may then repeat this operation with respect to other longitudinally spaced through bolt holes 26 at any other suitable longitudinally spaced locations along the pole 24, which will result in all of the mortise notches or gains, similar to the two illustrated at 25 in FIG. 2, to be completely parallel to one another since all of the through bolt holes were initially drilled completely parallel to one another. This means that all of the cross members (not shown), which may subsequently be fastened to the pole 24 at longitudinally spaced locations, will be completely parallel.

Incidentally, it should be noted that the initial drilling of all of the through bolt holes, such as the ones shown at 26, although they may be of any number and spacing, in a manner such that they will be completely parallel, may be conveniently accomplished by using the apparatus of the present invention in either the position shown in FIGS. 2 and 3 or in exactly the reverse position with the upper member 23 inserted into the through bolt hole 26, which will allow the worker to sight along the projection extending upwardly from the longitudinal member 20 in the direction of the dotted central plane indicated by the reference numeral 30 so that each of the longitudinally spaced holes may be drilled on the same line, and since they will all be drilled vertically, this will result in all of said holes being completely parallel.

Figure 6:
FIG. 6 is a larger scale side elevational view of the expandable washer means comprising a portion of the controllably expandable means shown in exploded form in FIG. 5.
Figure 7:
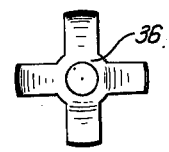
FIG. 7 is a plan view of the expandable washer illustrated in FIG. 6.

FIGS. 4–7 ilustrate a slightly modified form of the invention with similar portions indicated by similar reference numerals followed by the letter "A" and additionally including controllably expandable means carried by the hole-insert member and provided with a manually adjustable portion for effectively expanding or contracting the expandable means in a direction transverse to the downward direction of the hole-insert member for effective engagement with a hole. In the specific example illustrated, said controllably expandable means is indicated generally at 31 and is carried by the end 32 of the hollow hole-insert member 22A, and wherein the controllably expandable means takes the one specific exemplary form including a mounting portion 33, comprising a bolt head, positioned within the hollow hole-insert member 22A and lying immediately above the end 32 thereof, with said bolt head mounting portion 33 having a threaded shaft portion 34 extending through an aperture 35 in the end 32 of the hole-insert member 22A, with said threaded shaft portion projecting downwardly from said end 32 and carrying curved expandable washer means 36 of cruciform shape, as best seen in FIGS. 6 and 7, and with said threaded shaft 34 also carrying manually controllably advanceable and retractable threaded nut means 37 below the expandable washer means 36, with two spacing washers 38 being positioned on each side of the expandable washer 36; the arrangement being such that the threaded nut 37 may be advanced upwardly along the threaded shaft 34 from the normal position shown in FIG. 4, which will effectively flatten and widen the expandable washer 36 to a degree such that its overall maximum diameter will become greater than the diameter of the hole-insert member 22A whereby to facilitate engagement of the controllably expandable means 31 within a hole that is slightly too large for the hole-insert member 22A. It will be understood that the reverse operation of retracting the threaded nut 37 downwardly will effectively cause the expandable washer 36 to return to its normal maximum diameter so as to effectively release its engagement with a hole into which it has been inserted to facilitate removal of the hole-insert member 22A and the controllably expandable means 31 from such an oversize hole.

FIG. 10 illustrates in central cross-sectional form taken directly through the center of the longitudinal member 20B and the perpendicular hole-insert member 22B and the aligned upward extension 23B a slight modification of the first form of the invention illustrated in FIGS. 1–3, wherein the entire device is of solid construction, although preferably of relatively lightweight material such as magnesium, aluminum, plastic, or the like.

FIGS. 8 and 9 illustrate another slight modification of the invention wherein the entire device is of the solid type shown in FIG. 10 thus having a solid hole-insert member 22C, and wherein the controllably expandable means 31C comprises a slight modification of the controllably expandable means 31 illustrated in FIGS. 4–7; in this modification, the threaded shaft 34C being an integral extension of the solid hole-insert member 22C. Otherwise this modification of the hole-insert member 31C is similar to that illustrated in FIGS. 4–7 and described hereinbefore. Therefore, no further description of this modification is thought necessary.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. Apparatus for measuring the perpendicularity and flatness of a mortise transversely formed in a right circular cylindrical wooden pole, said mortise being gained on a chord of said pole and extending across the adjacent end of a diametrical cylindrical hole drilled in said pole, said apparatus comprising: an elongated member having a planar upper surface and a planar lower surface in spaced parallel relation, said member having a width narrower than the width between the walls defining the opposite sides of said mortise; a sighting member mounted on said planar upper surface intermediate the ends of said elongated member and extending perpendicularly upwardly from said planar upper surface; and a cylindrical hole-insert member mounted on said planar lower surface and extending perpendicularly downwardly therefrom and in alignment with said sighting member, said hole-insert member including radially expandable means for engaging the wooden walls defining said drilled hole in wood fiber deforming relation.

2. The device of claim 1 wherein the lower end of said hole-insert member includes a threaded portion extending downwardly from a shoulder and said threaded portion has concentrically disposed thereon a first washer adjacent said shoulder, a cruciform expandable washer bowed upwardly for abutment with said upper washer, a lower washer adapted to abut the outer margins of said cruciform washer, and a nut threadably engaged with said threaded portion whereby rotation of said nut compresses and expands said cruciform washer into wood-fiber deforming relation with respect to the encompassing wooden walls defining said cylindrical drilled hole for clamping said hole-insert member in said drilled hole.

References Cited in the file of this patent

UNITED STATES PATENTS

| 1,607,862 | Bath | Nov. 23, 1926 |
| 2,508,496 | Conzelman et al. | May 23, 1950 |
| 2,527,758 | Oslund | Oct. 31, 1950 |
| 2,782,517 | Daniel | Feb. 26, 1957 |

FOREIGN PATENTS

| 252,955 | Switzerland | Oct. 1, 1948 |
| 1,140,656 | France | Mar. 4, 1957 |